United States Patent [19]

Smart

[11] Patent Number: 4,661,073

[45] Date of Patent: Apr. 28, 1987

[54] CODE TUTORING SYSTEM

[76] Inventor: David L. Smart, 1311 Glendale Ave., Berkeley, Calif. 94708

[21] Appl. No.: 745,083

[22] Filed: Jun. 17, 1985

[51] Int. Cl.[4] ............................................. G09B 19/26
[52] U.S. Cl. ................................ 434/222; 340/347 R; 178/115
[58] Field of Search ............. 434/222; 178/115, 82 R, 178/82 A, 89; 340/706, 347 R, 756, 804

[56] References Cited

U.S. PATENT DOCUMENTS 4,255,749 3/1981 Henry .................................. 434/222

OTHER PUBLICATIONS

Terry Mayhugh, "Computer-Aided Morse Code Practice", Dec. 1979, Popular Electronics, pp. 64, 66, 68, 69, 70.

Primary Examiner—Leo P. Picard

[57] ABSTRACT

A Morse code tutoring system: a computer with an appropriate program and a code practice oscillator interfacing to it. In one mode of operation, the operator uses a straight key to produce code in the oscillator which is monitored by the computer, and analyzed for quantitative elements of his "amateur accent", that is, those characteristic of his code that make it harder for another person to decode. In another mode, the computer generates code which is output by the oscillator, and the operator decodes it and feeds back to the computer the decoded message. In subsequent lessons, the code generated is enriched in those characters that he fed back erroneously.

3 Claims, 1 Drawing Figure

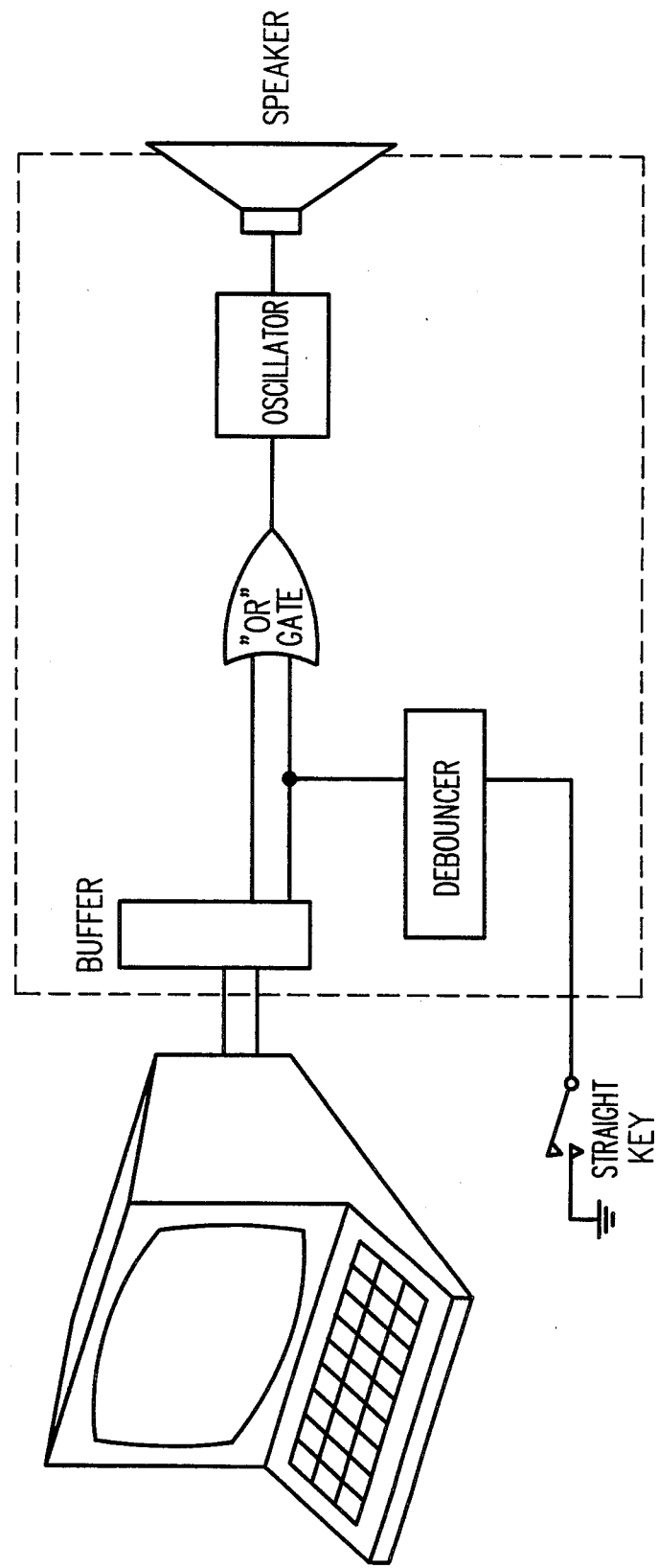

CODE TUTORING SYSTEM

BACKGROUND

This invention relates to computerized tutoring systems to teach Morse Code, and in particular to a system containing a computer interfacable code practice oscillator capable of inputting an operator's sending of code to a computer, wherein it is analayzed to determine the operator's "amateur accent".

Inventions in the past that have dealt with Morse code tutoring generally fall into two categories: those that produce code automatically, either for the purpose of teaching it or for otherwise handling it; and those that aid in the process of learning it.

Of the former, there are many inventions in the 1960s and earlier that produce code from some input denoting characters to be coded: most of them are mechanical or electromechanical devices of one kind or another; some are designed specifically to teach code and most are not. However since the proliferation of low-cost computers, the development of programs that can produce code from character input is now within the ordinary skill of an experienced programmer, and there exists on the market many programs that produce code, and many devices that interface to computers to handle the outputted code, such as code practice oscillators and ham radio interfaces. There are also interfaces and computer programs that decode received Morse code from an external source, such as a radio receiver, and display the resultant characters.

Of the latter, there are many learning aids, most of them mechanical devices to aid in memorizing the dit-dah pattern of the characters for the first time. These are generally of little use in helping the learner get his receiving speed up to the thirteen words per minute required of the General amateur radio license, to say nothing of the eighteen wpm required of most military schools or the twenty wpm required of the Amateur Extra Class license. However one patent, U.S. Pat. No. 3,373,507, by Judson Cornish, is a system of mnemonics to facilitate high-speed receiving of code.

Although there are today computer programs and interfaces that generate random groups of characters and encode and output them for an operator to receive, and check his results after the operator has inputted them; and also can generate a message similar to the "QSO" type message used in the FCC code exam for the amateur license, output it to the operator in code and check his decoding; there is nothing that generates a lesson that is "slanted" to an operator's demonstrated weak points. And more importantly there is no system that helps an operator overcome his "amateur accent" when he sends code. This "accent" is in effect the lack of consistency in the operator's dit length, dah length and the length of spaces between dit/dahs, between characters and between words, and departure of the proper ratios between these lengths from what they should be for best reception. A good code operator must be able to send code that can be received by another as easily as he is himself expected to receive from another. Since the "accent" is a matter of time intervals, his sending is capable of being analyzed for what those time intervals are. Every dit and every dah in a message, as well as the space between each one, is capable of being measured for duration. These lengths can be classified or grouped; indeed, this is mentally what we do in recognizing dits from dahs; and also the space length is analyzed to distinguish dit/dah separations from character separations and word separations. The computer program can do this too, not only for the purpose of distinguishing but for the purpose of finding averages and deviations from averages. The average dah length is compared to the average dit length, and the standard deviation is determined. The average space length between dits and dahs is likewise determined, and also the average space length between characters and between words. All of this information is reported to the operator, along with the translated code he sent and any unrecognizable characters.

The object of this invention, therefore, is to provide a system for learning Morse code consisting of a program for a micro computer and a code practice oscillator interfacing to it. Firstly, it provides for the operator to send code with a straight key and, in addition to decoding his output, analyzes the output for salient quantitative parameters of his "amateur accent": standard deviation of his dit length and his dah length, ratio of dah length to dit length, ratio of dit/dah spacing to dit length, ratio of character spacing to dit length, and ratio of word spacing to dit length. And secondly, it provides for a stream of characters to be generated, either random groups or a QSO-type message, encoded and played to the operator, and when the operator responds with the decoded message input to the computer, compares that input with the message originally generated and, noting errors in the operator's response, generates a second stream of characters that is enriched in those characters to which the operator responded incorrectly.

DESCRIPTION OF THE DRAWING

The invention is presently embodied in a program for the TRS-80 computer Model III and a code practice oscillator interfacing to its parallel (Model III) interface port. The claims however relate to the embodiment of the invention using any computer with a serial or parallel port. The drawing intends to show those aspects of the system which is claimed as an invention, and to teach a designer of a code tutoring system how to make and use the embodiment described. Thus, the computer is shown only in a rough pictorial way. No attempt is made to show the residence of the program COPATUT as described in the specification, in it or the media used to carry it physically to the computer, for such devices and subsystems are standard to the design and use of common computers. The device described in the specification as the Computer Controlled Code Practice Oscillator (C3PO) attaching to the computer with a suitable cable, is shown as an overall box. On it is a speaker; in it is a gated audio oscillator, debouncing circuitry and a buffer, shown as boxes within the overall box. These within boxes are subsystems described below. A standard "straight key" attaches to the C3PO with a cable and plug; it is shown.

DETAILED DESCRIPTION OF AN EMBODIMENT

Referring to the drawing, the Computer Controlled Code Practice Oscillator (C3PO) is designed to be a computer peripheral which is to be connected to the computer by either a serial type RS-232C interface, or a parallel interface, such as the computer might require. There will of course be a power connection and necessary internal power supplies, not shown. The C3PO is provided with a suitable connector (normally a standard phone jack would be used) for attaching the "straight" key. The straight key is simply a single pole, normally open pushbutton switch, designed for convenient repeated actuation by the operator; and is distinguished from an "iambic" key, which normally is a paddle that can be actuated in one direction to produce a dit of a standard length or the opposite direction to produce a dah.

The straight key's output goes through the debouncing circuitry as shown. There are many standard designs of debouncing circuitry known, and any of them are suitable, so long as they resolve any contact bounce in the key upon either make or break so that either action will produce, at the output of the debouncer, a single transition: low to high, or high to low. In a standard code practice oscillator there is generally no need for debouncing, since normal contact bounce will not affect the quality of the tone that the operator hears. But in a computer interface the debouncing circuitry is essential, so that the bouncing will not create false dits to be recorded by the computer.

Following the output of the debouncer the signal goes to the computer, and to an OR gate, as shown. The key signal is ORed with one from the computer. The output of the OR gate is the enable signal to the tone oscillator, and when enabled, the oscillator produces the tone heard on the speaker by the operator. When the operator is generating code, the debouncer outputs to the computer and to the OR gate, which in turn outputs to the oscillator so the operator hears the code he is generating. When the computer is generating code, its output enters at the other input of the OR gate, which also results in output to the oscillator.

The computer program COPATUT is written in BASIC except for the section concerned with the timing of the dit-dahs of the output code. This section is written in assembly language, so that delays asssociated with the BASIC interpreter do not affect the intended lengths of the dit-dahs in any inconsistent way. For a computer with a CBASIC compiler it is of course possible to write the entire program in compiled BASIC.

When the operator starts the program it first asks him if the C3PO is properly attached to the computer. If he says it is, he is then presented with a menu. The six choices of the menu are: (1) C3PO checkout; (2) send code to COPATUT for analysis; (3) receive code from COPATUT, on-line crypto; (4) receive code from COPATUT, off-line crypto; (5) receive code from COPATUT in the form of a QSO like a FCC amateur code test; (6) exit to BASIC.

The C3PO checkout consists of a very short message sent from COPATUT to C3PO, typically three "CQ's". Then the operator is asked to send CQ three times from the straight key, through C3PO to the computer. The program analyzes this input, reporting it if in anyway different from three CQ's or if there is none at all. The details of how the program and the C3PO handles this will be evident when the subsequent menu choices are explained.

When the operator chooses to send code, the program prepares itself to receive it, which is on one bit input, high for a tone and low for no tone.

While the operator is sending the code and the computer receiving, the computer times the length of each ON duration and each OFF duration. These times are stored in an array whose successive elements are successive ONs and OFFs. Thus, odd numbered elements are ON times and even numbered elements are OFF times, but as a check the OFF times are stored as negative numbers. When the operator is finished with his message he pushes the ENTER key (or any key, actually). This signals the program to analyze the message.

First the program determines the length of the longest and the shortest ON. Then, the length of 45% of the longest ON is used as the separation criteria between "dits" and "dahs". This has been determined by experience with many operators, beginning and advanced. In general, an operator's "dahs" are more consistent in length than his "dits". Since a dit is supposed to be one-third the length of a dah, there is reasonable expectation that the shortest dah will be more than 45% the length of the longest dah, whereas the longest dit will be less than 45% of the longest dah. The dits and dahs having just been identified among the ONs, the average dit length is determined, the standard deviation from the average; and likewise the average dah length and standard deviation. The 45% of the longest dah is used also as a criteria to analyze the OFF times, to sort dit-dah spacings from character spacings. A value of twice the average dah length is used to separate character spacings from word spacings. Since a dit-dah spacing is supposed to be equal in length to a dit, a character spacing equal to three dits, or one dah, and a word spacing equal to seven dits, or 2.33 dahs, these should be reasonable criteria to separate dit-dah spacings from character spacings, and character spacings, from word spacings. Then, among the spacings, the average dit-dah spacing duration, the average character spacing, and the average word spacing length is determined.

Having distinguished dits from dahs, and dit-dah spacings from character spacings and word spacings, it is now possible for the program to decode the operator's code, assuming the operator's dit length, dah length and spacing length is consistent enough for all of the dits, dahs and spaces to fall within the above criteria. And it does so, but more importantly it analyzes the tone lengths and no-tone lengths further, to determine the average dit length and the standard deviation of dit length from the average; average dah length and standard deviation, and as mentioned above the average dit-dah spacing length, average character spacing length and average word spacing length. Then, it determines the ratio of the average dah length to the average dit length, average dit-dah spacing length to the average dit length, average character spacing length to average dit length, and average word spacing length to average dit length.

The results presented to the operator include: his effective speed in words/minute; the standard deviation of dit length, so as to indicate to him how variable his sending is; the standard deviation of dah length, likewise so indicating; ratio of dah length to dit length, which ideally should be 3.0 and so indicates how far off his sending is in this; ratio of dit/dah spacing to dit length; which ideally should be 1.0, ratio of character spacing to dit length; which ideally should be 3.0, ratio of word spacing to dit length; which ideally should be 7.0; and the decoding of his message by the sorting criteria outlined above.

The departures of the ratios from what they should be, and the standard deviation of the operator's dits and dahs are a quantitative measure of his "amateur accent". This along with his decoded message and his words/minute, are consise and quite complete evaluation of his sending of code.

In the Receive Code mode-On Line Crypto, the program generates a random stream of characters, consisting of either alphabetics only, or alphabetics numerics and certain punctuation, at the selection of the operator. The operator also selects the speed, which could be as low as 3 words/minute equivalent rate or as high as 30 words/minute. The stream of characters generated is translated into code by the program and output to the interface. In the C3PO this signal, transmitted through the buffer, is ORed by the aforementioned OR gate with that from the key, which this time is carrying no signal. The resulting signal triggers the oscillator as before, and the operator hears the code. For each character heard, he is to type in the character on the keyboard, and the computer inputs it. If not the same as the character coded and output, the character is displayed on the screen and also remembered. The program will wait for the operator to input the character. A lesson may be as few as 40 words or as many as 120, depending on the speed selected.

At the end of the lesson the operator is asked whether he wants a subsequent lesson that is enriched in the characters he erred in. If he says he does, the process of generating characters and code is repeated, as modified by the enriching process.

Here is how that process words: Without the process in effect, there are, depending on the operator's selection, either a total of 26 alphabetic characters or 41 alphameric and punctuation characters to select randomly from in generating the stream of characters. A random number generator is accessed with a radix of either 26 or 41 as appropriate. Each alphameric and punctuation is assigned a number from 1 through 41 (alphabetics are 1 through 26) and, each time that number comes out of successive accessing of the random number generator, that character is the next in the stream. Thus, without enrichment, each character has an equal chance of being selected and, were the lesson infinitely long, an equal frequency of selection would be prevailing for each character. With the process in effect, the erred characters are first analyzed for those characters appearing in the error list only once, vis-a-vis those appearing more than once. The number "u" of characters missed only once is noted, as well as the number "v" of different characters missed more than once. The total "u"+"v" will of course be less than the total number of characters in the error list, unless "v" is zero, that is, all characters in the list appear only once. The radix, 26 or 41, is increased by the quantity "u"+2"v". Then the first "u" values after 26 (or 41 as appropriate) are assigned the erred-once characters. Each pair of values that follows are assigned the erred-more than once characters. Random selection then follows with the augmented radix. But now the erred-once characters appear twice in the list of characters, and so have twice the chance of selection as those not missed; and the erred-more-than-once characters have three times the chance of selection as the others, as they appear a total of three times in the list. Thus the lesson that is generated with the enrichment process in effect, will be enriched in those characters erred.

As an example of this process, consider a lesson consisting of alphabetics only. For the initial generation of characters there is a radix of 26, the numbers 1 through 26 corresponding to each alphabetic character. Suppose that in taking this lesson the operator misses D, N and W, once, and F twice, and L three times. The error list will thus have 8 entires, of 5 different characters. The radix would be increased by 7, to 33. 27 would be D, 28 would be N, 29 would be W, 30 and 31 would be F, and 32 and 33 would be L. Then, during the generation of the subsequent lesson, the non-erred characters would each have one chance in 33 of coming up each random access. But D would result from either 4 or 27 coming up and so would have 2 chances in 33 each access. And F would result from either 6, 30 or 31 coming up and so would have 3 chances in 33 for each access.

During the subsequent lesson the operator agains inputs the decoded characters and, errors are displayed and noted as before. At the end of the lesson he is again asked if he wants another lesson enriched in those characters erred and, if he does, the lesson then generated is enriched in those characters missed on the last previous lesson.

Thus, the operator gets extra practice in those characters that he has erred in. And since the characters were generated by a random number generator, there are no sequences of characters that he might "memorize" where he to do the lesson many times.

The Receive Code-Off Line Crypto is like the On-Line Crypto, except that the computer does not wait for the operator to input a character before sending the next. The characters are sent in groups of five followed by a space. The operator copies the characters on a separate sheet of paper. At the end of the test the characters output are displayed on the screen, and the operator corrects his copy. He is then asked to type in those characters missed only once, followed by those he missed more than once. These two lists form the basis by which a subsequent lesson is generated by a process similar to the above, enriched in those characters erred.

The Receive Code-FCC test lesson results in a QSO generated that is like that typically used by the FCC in the amateur license code test. An example of part of a stream of characters generated is: "W6DFG DE N6QWE QTH ANTIOCH NAME IS TOM RIG IS KENWOOD 730J ANT IS BEAM".... In this the call sign begins with a W, N or K selected at random, followed by a number selected at random from 0 to 9. The three subsequent alphabetics are also selected at random. The city is selected randomly from a selection of 30 cities, except there is correlation between the city selected and the numeric of the sending call sign, which numeric is the appropriate region of the country as designed by the FCC. In a similar manner the name is selected randomly from a list of 30, the rig from a list of 20, and the antenna type from a list of 30. The resultant stream is then encoded as per the other receive-code lessons, output to the C3PO. The operator decodes it and copies it onto a separate sheet of paper. At the end of the lesson the generated code is shown, so the operator can see if he made any errors in decoding.

Many other embodiments can be envisioned within the spirit of the invention as described here. Because of the many alternative embodiments, the detailed description given above is to be considered exemplary, and not in a limiting sense. The actual limits of the invention are given only by the claims.

I claim:
1. A Morse code tutoring system, comprising:
   a micro computer, containing suitable interfacing means,
   a "straight key",
   a code practice oscillator, interfacing to the computer, and capable of effecting a visual or aural indication when actuated by the operator via the straight key, and capable of outputting to the computer the results of such actuation, a program available for execution by the computer, and capable of analyzing the operator's code for: average length of dits and standard deviation thereof, average length of dahs and standard deviation thereof, ratio of the average dah length to the average dit length, ratio of average length of space between dits and dahs to the average dit length, ratio of average length of space between characters to the average dit length, and ratio of average length of space between words to the average dit length;

so as to provide the operator quantitative information on the quality and readability of the code he is generating.

2. A Morse code tutoring system according to claim 1, with the program additionally capable of decoding the operator's code input by means of identifying characters and words from the compiled lengths of dits, dahs, and spaces; and providing means of presenting the characters and words generated.

3. A Morse code tutoring system according to claim 1, further characterized in that:

the computer program is capable of generating Morse code, and outputting it in the form of a first lesson, via the interface, to the code practice oscillator, the code practice oscillator is capable of producing indications to the operator from the computer's output, the computer, by means of a keyboard, is capable of receiving, from the operator, his decoding of the code outputted, and the program is capable of analyzing the operator's response, and can compile a second lesson that is enriched in those characters which the operator entered in error during the first lesson;

so that the second and any subsequent lesson can provide the operator additional practice in those characters which he decoded erroneously.

* * * * *